United States Patent [19]

Benson

[11] Patent Number: 4,561,743

[45] Date of Patent: Dec. 31, 1985

[54] DISC CAMERA DRIVE

[75] Inventor: Lee Benson, Hong Kong, Hong Kong

[73] Assignee: Overseas Promotions Ltd., Wanchai, Hong Kong

[21] Appl. No.: 617,247

[22] Filed: Jun. 4, 1984

[30] Foreign Application Priority Data

Jun. 9, 1983 [GB] United Kingdom ................. 8315893

[51] Int. Cl.$^4$ ............................................... G03B 1/00
[52] U.S. Cl. .................................................... 354/121
[58] Field of Search ......................... 354/121, 204, 206

[56] References Cited

U.S. PATENT DOCUMENTS 3,728,950 4/1973 Lange .................................. 354/204
4,449,806 5/1984 Wong et al. ........................ 354/121

FOREIGN PATENT DOCUMENTS 497266 12/1938 United Kingdom .
720194 12/1954 United Kingdom .
1461063 1/1977 United Kingdom .
1583591 1/1981 United Kingdom .

Primary Examiner—John Gonzales
Attorney, Agent, or Firm—James & Franklin

[57] ABSTRACT

A disc camera drive mechanism has a manually movable film advance member reciprocable between a rest and an actuated position, a shutter and a manually movable shutter release element. Drive means actuated by the film advance member on its movement to actuated position rotates the disc film and activates spring means. Spring retainer means retains the spring means in activated position. Release of the spring means operates the shutter on actuation of the shutter release element. A spring urged film detent element is actuated by the drive means, and on release of the spring means the detent element is urged against the film during the latter part of its advance so as to engage a film detent opening when the latter comes into register. The detent element is withdrawn from the opening after the shutter is operated. A stop movable with the detent element may block shutter movement when the detent element is in its withdrawn position.

8 Claims, 7 Drawing Figures

DISC CAMERA DRIVE

FIELD OF THE INVENTION

This invention relates to disc cameras and its main object is to provide a convenient and simple mechanical drive arrangement which locates the film positively during shutter operation.

SUMMARY OF THE INVENTION

The invention accordingly comprises a manually movable film advance member reciprocable between a rest and an actuated position, and a manually movable shutter release element; spring means; a shutter; drive means actuated by the film advance member on its movement to actuated position to rotate the disc film and activate the spring means; spring retainer means to retain the spring means in activated position and release the spring means to operate the shutter on actuation of the shutter release element, and a spring urged film detent element actuated by the drive means and on release of the spring means whereby the detent element is urged against the film during the latter part of its advance so as to engage a film detent opening when the latter comes into register, and the detent element is withdrawn from the opening after the shutter is operated.

Preferably a stop movable with the detent element blocks shutter movement when the detent element is in its withdrawn position.

One embodiment of the invention will now be described with reference to the accompanying drawings.

DESCRIPTION OF PREFERRED EMBODIMENT

Figure 1:
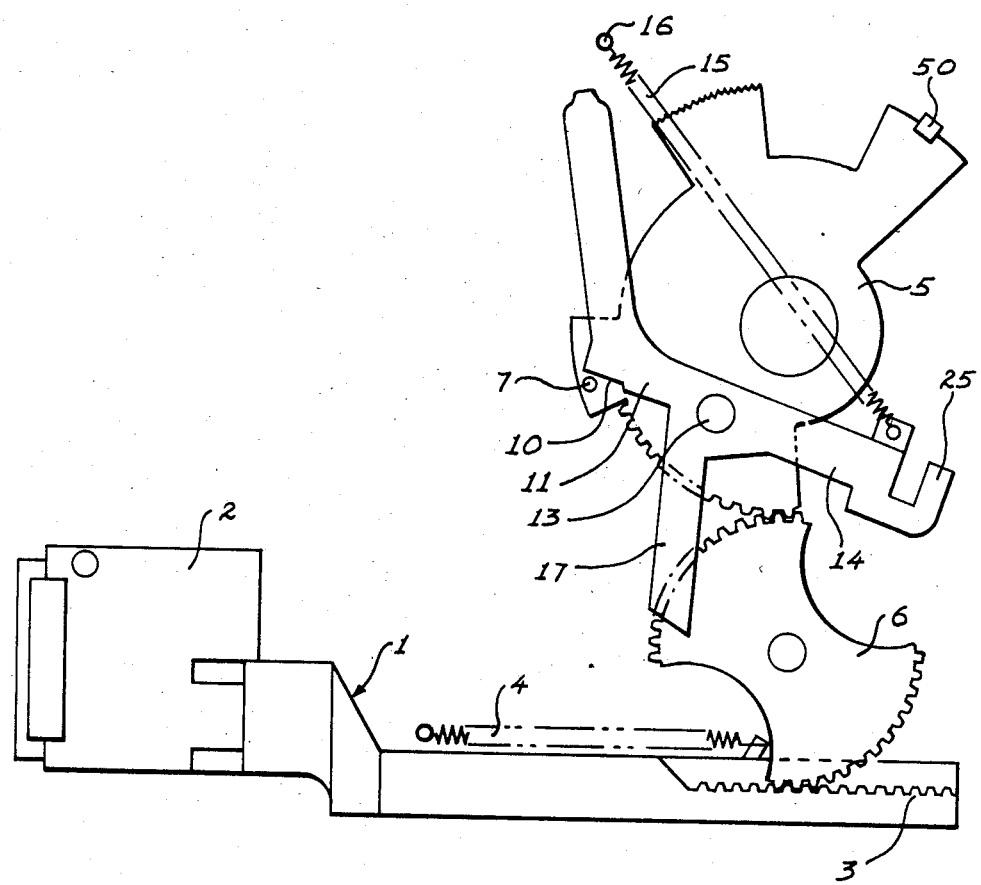
FIG. 1 is a diagrammatic elevation showing movable parts associated with the film advance means, drive means and spring in the film-advanced, spring-tensioned condition.
Figure 4:
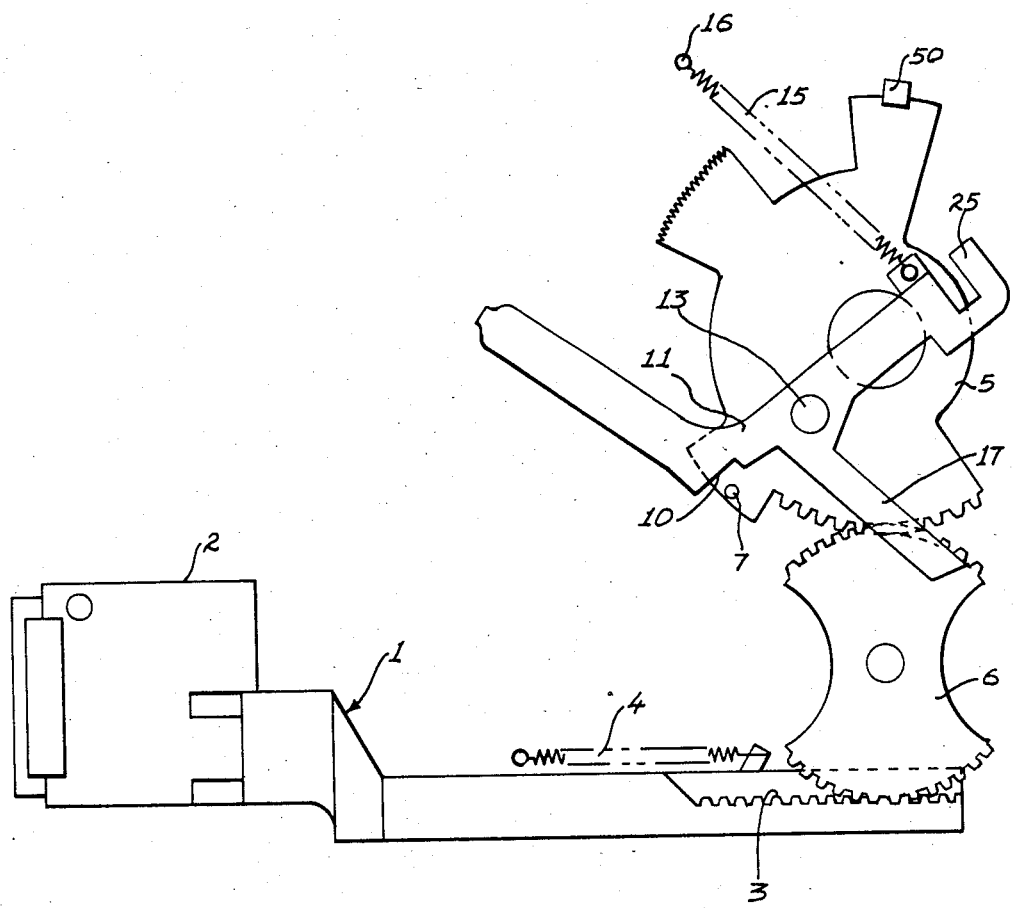
FIGS. 4, 5 and 6 are views corresponding to FIGS. 1, 2 and 3 showing the same parts in the spring-released film exposed condition ready for film advance.
Figure 5:
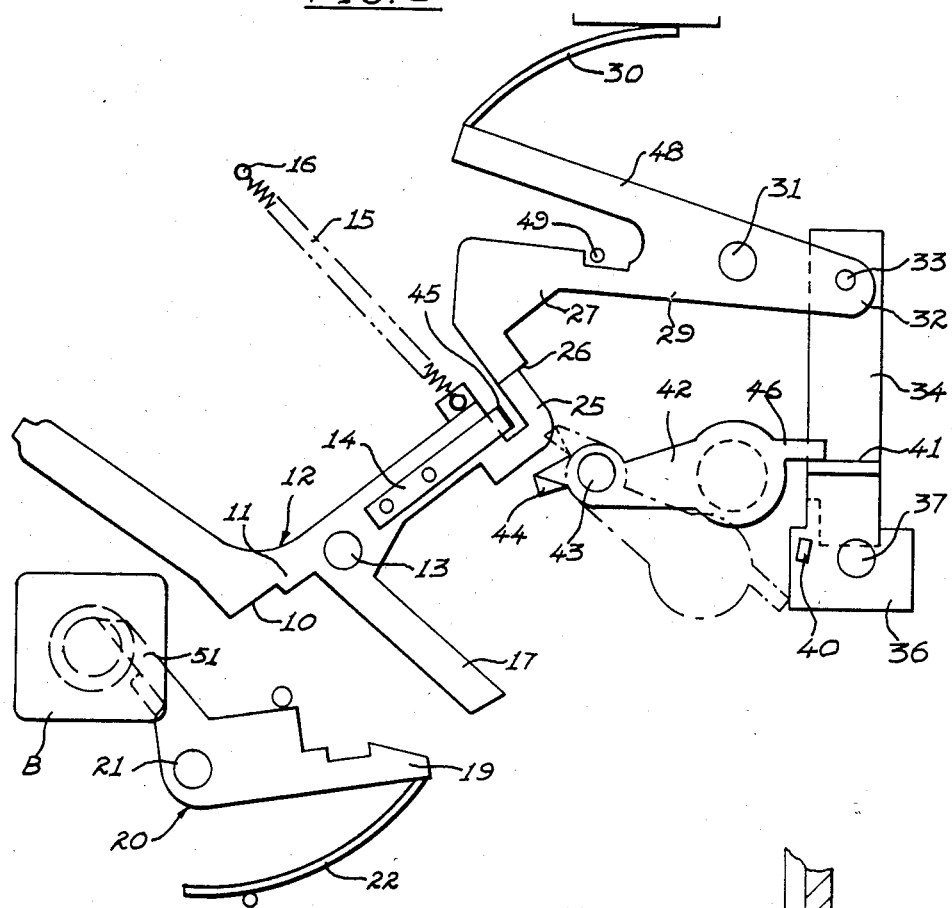
Figure 7:
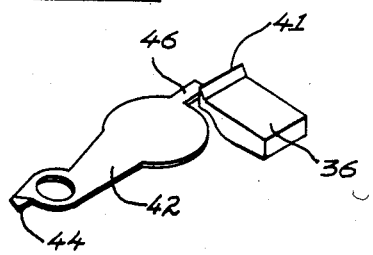
FIG. 7 is a perspective detail showing co-operation of shutter and detent member.
Figure 6:
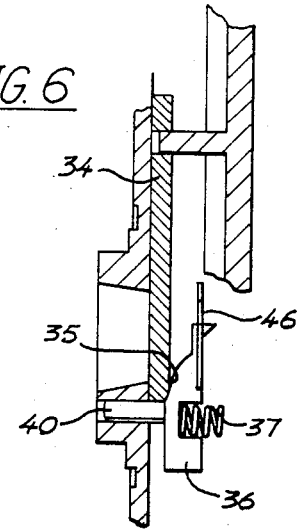

Referring to the drawings, a reciprocable member 1 comprising a thumb slide 2 and a rack 3 is urged by a spring 4 to a rest position (FIG. 4) and movable manually to an actuated position (FIG. 1). A film drive spindle (not shown) is concentric with and driven through a ratchet (not shown) by a main gear member 5 meshing with a second gear member 6 meshing in turn with the rack 3. Rack 3 and gear members 5, 6 are situated in a first plane.

A pin 7 on the main gear member 5 is positioned for engaging a shoulder 10 on one arm 11 of a 3-arm lever 12 pivoted at 13 for movement in a second plane parallel to that of the gear member 5. The lever 12 has an operating arm 14 carrying one end of a tension spring 15 anchored at 16. A retainer arm 17, also part of the 3-arm lever 12 co-operates with a one arm 19 of a retainer element 20 in the form of a bell crank 20 pivoted at 21 and urged by an integral leaf spring 22 towards the retainer arm. All these levers are in the second plane. When the thumb slide 2 is reciprocated to its actuated position pin 7 moves 3-arm lever 12 to tension the spring 15, and retainer arm 17 cams back the arm 19 of bell crank 20 until it engages in a notch 23 in that arm, which prevents release of the spring.

Figure 2:
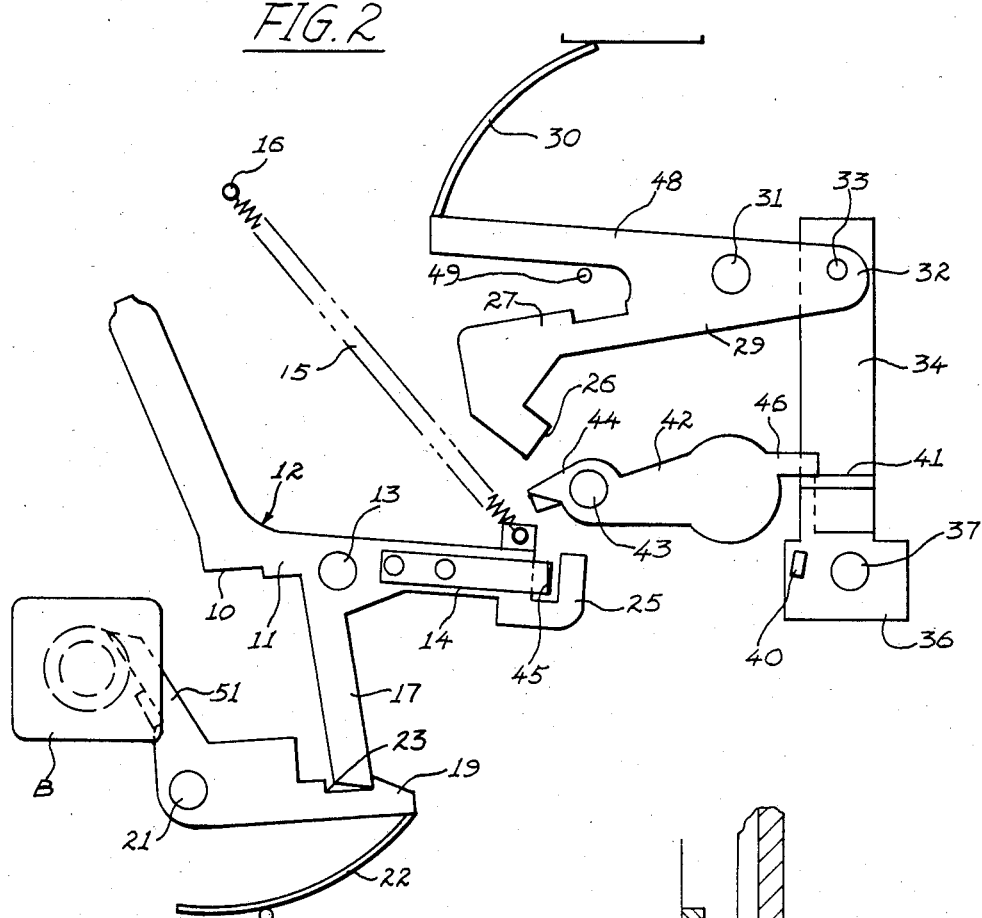
FIG. 2 is a diagrammatic elevation showing the spring, spring retainer and release means, film detent element and shutter, in the spring-tensioned condition ready for film exposure.
Figure 3:
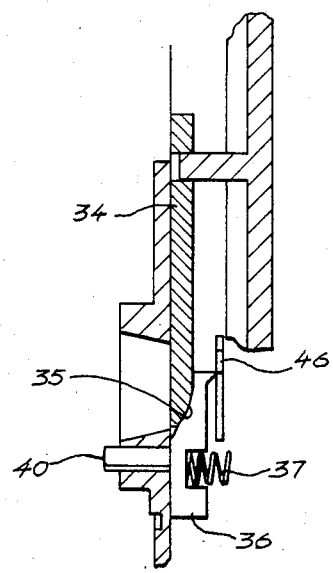
FIG. 3 is a side view of the detent element and associated parts in the spring-tensioned detenting condition.

Operating arm 14 of the 3-arm lever 12 terminates in a striker 25 co-operating with a shoulder 26 on one arm 27 of a V-shaped lever 27 urged to the FIG. 2 position by an integral leaf spring 30 and pivoted intermediately at 31. The end 32 of the lever 29 opposite shoulder 26 is connected by a pin 33 to a slide 34 movable in the first plane. The slide 34 has its lower end (in the orientation illustrated) formed as a cam 35 to actuate a follower plate 36, floating in a cavity and urged downwardly (as illustrated) by a spring 37. The follower plate 36 carries a detent pin 40 directed towards film in the camera, and a lip 41.

A metal shutter plate 42 pivoted at 43 and spring urged to the closed position illustrated has an operating arm 44 in way of a metal striker 45 on the operating arm 14 of the 3-arm lever 12. A projection 46 on the shutter plate co-operates with the lip 41 on the follower plate 36.

As the thumb slide 2 is moved to actuated position to tension the spring 16 the striker 25 on operating arm 14 withdraws from arm 27 of V-lever 29 and the spring 30 moves the arm 27 downwards until the other arm 48 of the V-lever meets a fixed abutment pin 49. Glide 34 moves upwards, withdrawing cam 35 so that, after a certain initial movement of the slide 34 the follower plate 36 moves to bring the detent pin 40 against the film, which at this point is turning to its new position. The pin 40 engages the next notch in the film and holds the film firmly in position. The lip 41 on plate 36 moves out of the way of the projection 46 on the shutter plate 42.

Release of the thumb slide 42 to its initial position has no direct effect, but a second actuating movement is prevented by pin 50 on the main gear member 5 engaging the end of arm 48 of the V-lever 29.

Release movement of bell crank 20 is initiated by camming action of a shutter release button B which moves the lever 51 of the bell crank clockwise (as shown) to release the 3-arm lever 12. Operating arm 14 of the 3-arm lever then moves counter-clockwise rapidly under action of the spring 15. Striker 45 operates the shutter plate 42 as it moves past the operating arm 44 thereof and striker 25 then moves the V-lever 29 to move the slide 34 so as to cam the follower plate 36 away from the film, thus withdrawing the detent pin 40 from the notch therein. The lip 41 again co-operates with the shutter plate 42 to prevent shutter movement.

I claim:

1. A disc camera drive which comprises a manually movable film advance member reciprocable between a rest and an actuated position, and a manually movable shutter release element; spring means; a shutter; and drive means including a first pivoted lever actuated by the film advance member on its movement to its actuated position to rotate the disc film and activate the spring means; spring retainer means to retain the spring means in activated position and release the spring means to operate the shutter on actuation of the shutter release element; a second pivoted lever pivotal in the same plane as the first pivoted lever; and a cam mechanism operating a spring urged detent for selectively engaging the disc film to lock it against advance, wherein the first pivoted lever, upon release of the spring means, operates the shutter and engages an arm of the second pivoted lever, the other arm of which is coupled to the cam mechanism whereby the detent element is urged against the film during the latter part of its advance so as to engage a film detent opening when the latter comes into register, and the detent element is withdrawn from the opening after the shutter is operated.

2. A disc camera drive as claimed in claim 1, wherein a stop movable with the detent element blocks shutter movement when the detent element is in its withdrawn position.

3. A disc camera drive as claimed in claim 1 or claim 2 wherein the detent element comprises a pin reciprocable along a line generally perpendicular to the plane of the pivoted levers, the element being spring-urged towards the film.

4. A disc camera drive as claimed in claim 3, wherein the detent element has a portion acting as a cam follower and wherein the cam mechanism comprises a reciprocating cam member acting directly thereon.

5. A disc camera drive as claimed in claim 1, wherein the first pivoted lever has a retainer portion cooperating with the spring retainer means, a first striker portion which strikes the shutter following release of the spring means, and a second striker portion which engages said arm of the second pivoted lever to effect withdrawal of the detent element following operation of the shutter.

6. A disc camera drive as claimed in claim 5, wherein the detent element comprises a pin reciprocable along a line generally perpendicular to the plane of the pivoted levers, the pin being spring-urged towards the disc film, and wherein the cam mechanism comprises a cam member articulated to the second pivoted lever to reciprocate the pin.

7. A disc camera drive as claimed in claim 5, wherein the second striker portion cooperates with the arm of the second pivoted lever to limit movement of the first pivoted lever and retain the spring means under tension until movement of the film advance member moves the second striker portion away from the second lever.

8. A disc camera drive which comprises a manually movable film advance member reciprocable between a rest and an actuated position, and a manually movable shutter release element; spring means; a shutter; and drive means actuated by the film advance member on its movement to its actuated position to rotate the disc film and activate the spring means, which drive means included a rotatable lever biased by the spring means to an operated orientation and with first, second, and third arms, the first arm being engaged by a lug coupled to the advance member as the advance member is moved to its actuated position to rotate the lever against the spring means, such rotation moving the second arm into latching engagement with a retainer element operatively coupled to the shutter release element, the retainer element being operable to retain the spring means in an activated position and release the spring means on actuation of the shutter release element, and the third arm bearing a striker for operating the shutter upon such release of the spring means as the lever is rotated by the spring means to its operated orientation; a pivoted lever pivotal in the same plane as the rotatable lever; and a cam mechanism operating a spring urged detent for selectively engaging the disc film to lock it against advance, wherein the third arm, upon release of the spring means, operates the shutter and engages an arm of the pivoted lever, the other arm of which is coupled to the cam mechanisim whereby the detent element is urged against the film during the latter part of its advance so as to engage a film detent opening when the latter comes into register, and the detent element is withdrawn from the opening after the shutter is operated.

* * * * *